(12) United States Patent
Nobe et al.

(10) Patent No.: US 6,334,353 B1
(45) Date of Patent: Jan. 1, 2002

(54) KNOCK DETECTION APPARATUS FOR AN INTERNAL COMBUSTION ENGINE

(75) Inventors: Hisanori Nobe; Yasuyoshi Hatazawa; Koichi Okamura; Mitsuru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,514

(22) Filed: Jan. 14, 2000

(30) Foreign Application Priority Data

Aug. 31, 1999 (JP) ............................................. 11-244884

(51) Int. Cl.$^7$ ............................................. G01M 15/00
(52) U.S. Cl. ..................................................... 73/35.04
(58) Field of Search ............................. 73/35.01, 35.03, 73/35.04, 35.05, 35.06, 35.08; 123/425, 435

(56) References Cited

U.S. PATENT DOCUMENTS 4,523,566 A * 6/1985 Kobayashi ................. 73/35.03

* cited by examiner

Primary Examiner—Helen Kwok

(57) ABSTRACT

To obtain a knock detection apparatus for an internal combustion engine which may obtain a good knock pulse S/N even if an ionic current generation amount is changed by the change of a kind of fuel or plugs, a vibratory component superimposed on an ionic current generated by combustion of fuel is extracted and shaped in waveform into a pulse waveform by comparison with a threshold value, the number of the pulses in the pulse waveform is calculated by a calculation unit, and a control of an ignition timing is performed on the basis of an output result of the calculation unit. The knock detection apparatus for an internal combustion engine comprises an integration circuit for integrating (charging) the vibratory component superimposed on the ionic current and a discharge circuit for discharging a predetermined amount of charge from the integrated charge. The threshold value is self-adjusted by a balance of charge/discharge between the integration circuit and the discharge circuit.

20 Claims, 12 Drawing Sheets

KNOCK DETECTION APPARATUS FOR AN INTERNAL COMBUSTION ENGINE

BACKGROUND OF THE INVENTION

1. Field of the Invention

The present invention relates to a knock detection apparatus for detecting a knock generated in an internal combustion engine and for controlling an ignition timing.

2. Description of the Related Art

It is generally known that ion is generated if fuel is burnt within a cylinder of an internal combustion engine. Therefore, if a probe to which a high tension voltage is applied is provided within the cylinder, it is possible to observe this ion in terms of the ionic current. Also, if the knock is generated in the internal combustion engine, since a vibratory component of the knock is superimposed on the ionic current, it is possible to detect the generation of the knock by extracting this vibratory component therefrom.

FIG. 10 is a circuit diagram showing a conventional knock detection apparatus using the ionic current. First of all, in this circuit, an ignition plug 1 is used as a detection probe for the ionic current. A high tension voltage (bias voltage) for detecting the ionic current by utilizing a secondary voltage of an ignition coil 2 is charged to a bias means 3. When the discharge for the ignition has been completed, the bias voltage charged during the discharge period is applied to an end of the plug 1 to detect the ionic current.

In this apparatus, a knock detection circuit 4 shapes a vibratory component, extracted from the ionic current, into a pulse form on the basis of a predetermined threshold value. A change of the number of pulses of the pulse form is calculated by an ECU 5. The ignition timing is adjusted by the result and the generation of the knock is suppressed.

In general, a peak value of the ionic current is changed in accordance with a kind of fuel or an operational condition of he internal combustion engine. However, there is a tendency that at a low rpm, the ionic current is small and at a higher rpm, is larger. The value thereof is in the range of several $\mu A$ to several hundreds of $\mu A$.

FIG. 11 is a block diagram showing the knock detection circuit 3 shown in FIG. 10 in more detail. When the ionic current is fed by the high tension voltage applied by the bias means 3, the ionic current is distributed into a mask 9 and a BPF (band pass filter) 8 for extracting the vibratory component by a current distributing means 7. The mask 9 is composed of a means for shaping the form of the ionic current by the predetermined threshold value to generate a pulse and a means for masking the pulse for a predetermined period of time for interrupting the noise by the ignition. The combustion/misfire may be judged in accordance with the pulse which will be referred to as a combustion pulse.

A window 10 starts an integration (charge) of the ionic current when the combustion pulse is turned on. When this integrated value reaches a predetermined value, a knock detection window is opened. The output is fixed by output limit 14 so as not to generate the knock pulse until the integrated value reaches the predetermined value. Also, when the combustion pulse is turned off, the knock detection window is closed.

After the vibratory component of the knock has been extracted by the BPF 8, it is amplified by an amplifier 11. The vibratory component is shaped in accordance with the predetermined threshold value in a comparator portion 13 so that the knock pulse is generated. The predetermined threshold value is set in a knock detection threshold setting portion.

FIG. 12 shows an operative shape example of each section of the circuit shown in FIG. 11. Also, FIG. 13 is an S/N graph of the number of the knock pulses upon the knock/non-knock.

The knock pulse detected as mentioned before is transmitted to the ECU 5. In the ECU 5, a background level (knock judgement level) is calculated from the number of the knock pulses under the regular operational condition (when the knock is not generated). Then, it is judged that the knock is generated when the knock pulse exceeding the background level is generated, so that the ignition timing is changed in response to the knock strength in a direction in which the knock is not generated. When the knock is not generated, the ignition timing is likely to be gradually returned to the predetermined value to thereby perform the knock control.

However, if additives (such as K or Na) are mixed into the fuel, the ionic current is increased to a magnitude that is several time larger than that of the usual case even if the amount of the additives are small like several ppms. The ionic current has the same original frequency component. When the ionic current is increased, this frequency component becomes the same as the vibratory component upon the knock generation. In spite of the non-knock condition, the number of pulses is increased, so that the S/N ratio of the knock/non-knock disappears. There is a problem that the knock control is impossible. FIG. 14 shows the S/N ratio upon the containment of the additives measured under the same operational condition of the internal combustion engine as in that shown in FIG. 13.

The element relating to the increase/decrease of the ionic current is a time change of the internal combustion engine or the shape of the ignition plug in addition to the fuel characteristics described above. In these cases, the same problem might be also raised.

SUMMARY OF THE INVENTION

In order to overcome the above-noted defect inherent in the prior art, an object of the present invention is to provide a knock detection apparatus for an internal combustion engine in which a threshold value of the knock detection is adjusted by itself so that even if ionic current generation amount is changed due to the change of the fuel or the kinds of the plugs, it is possible to obtain a knock pulse S/N in accordance with a knock/non-knock.

In order to achieve the above object, according to one aspect of the present invention, there is provided a knock detection apparatus for an internal combustion engine for detecting a knock generated in an internal combustion engine, in which a vibratory component superimposed on an ionic current generated by combustion of fuel is extracted and shaped in waveform into a pulse waveform by comparison with a threshold value, the number of the pulses in the pulse waveform is calculated by a calculation means, and a control of an ignition timing is performed on the basis of an output result of the calculation means, comprises an integration circuit for integrating (charging) the vibratory component superimposed on the ionic current; and a discharge circuit for discharging a predetermined amount of charge from the integrated charge, wherein the threshold value is self-adjusted by a balance of charge/discharge between the integration circuit and the discharge circuit.

According to another aspect of the present invention, there is provided a knock detection apparatus for an internal combustion engine, wherein the integration circuit integrates (charges) the vibratory component during a predetermined integration period.

According to still another aspect of the present invention, there is provided a knock detection apparatus for an internal combustion engine, wherein the integration period is a fixed time period from a time at which the ionic current that is equal to or more than a predetermined amount is generated during a predetermined period of time.

According to a further aspect of the present invention, there is provided a knock detection apparatus for an internal combustion engine, wherein the integration period is a fixed time period from a time when an integration (charge) voltage is equal to or more than a predetermined value while the integration (charge) of the ionic current starts from the time when the ionic current that is equal to or more than the predetermined amount occurs for a predetermined period of time.

According to a still further aspect of the present invention, there is provided a knock detection apparatus for an internal combustion engine, wherein the integration period is a time period from a time when an integration (charge) voltage is equal to or more than a predetermined value while the integration (charge) of the ionic current starts from the time when the ionic current that is equal to or more than the predetermined amount occurs for a predetermined period of time until the ionic current is equal to or less than a predetermined amount.

According to another aspect of the present invention, there is provided a knock detection apparatus for an internal combustion engine, wherein the discharge circuit performs the discharge at a constant current during a predetermined discharge period.

According to still another aspect of the present invention, there is provided a knock detection apparatus for an internal combustion engine, wherein the discharge period is a fixed time period from a time when the ionic current that is equal to or more than a predetermined amount occurs.

According to a further aspect of the present invention, there is provided a knock detection apparatus for an internal combustion engine, wherein the discharge period is a fixed time period from a time when the ionic current that is equal to or more than a predetermined amount occurs for a predetermined period of time.

According to a still further aspect of the present invention, there is provided a knock detection apparatus for an internal combustion engine, wherein the discharge period is a fixed time period from a time when an integration (charge) voltage is equal to or more than a predetermined value while the integration (charge) of the ionic current starts from the time when the ionic current that is equal to or more than the predetermined amount occurs for a predetermined period of time.

According to another aspect of the present invention, there is provided a knock detection apparatus for an internal combustion engine, wherein the discharge period is a time period from a time when the ionic current that is equal to or more than a predetermined value occurs for a predetermined period of time while the integration (charge) of the ionic current starts from the time when the ionic current that is equal to or more than the predetermined amount occurs until the integration (charge) voltage is equal to or more than a predetermined amount.

According to still another aspect of the present invention, there is provided a knock detection apparatus for an internal combustion engine, wherein the discharge period is a period from a time when the ionic current that is equal to or more than a predetermined value occurs for a predetermined period of time while the integration (charge) of the ionic current starts from the time when the ionic current that is equal to or more than the predetermined amount occurs until the integration (charge) voltage is equal to or more than a predetermined amount and a fixed period following the period.

According to a further aspect of the present invention, there is provided a knock detection apparatus for an internal combustion engine, wherein the vibratory component is shaped in waveform by a second threshold value obtained by adding a predetermined voltage to a first threshold value that is the threshold value.

According to a still further aspect of the present invention, there is provided a knock detection apparatus for an internal combustion engine, wherein the voltage added to the first threshold value is a function of the first threshold value.

According to another aspect of the present invention, there is provided a knock detection apparatus for an internal combustion engine, wherein an area, to be integrated (charged), of the vibratory component on the basis of at least one of the first threshold value and the second threshold value is only a predetermined portion.

According to still another aspect of the present invention, there is provided a knock detection apparatus for an internal combustion engine, wherein the integration circuit does not integrate (charge) the vibratory component that is not greater than the first threshold value.

According to a further aspect of the present invention, there is provided a knock detection apparatus for an internal combustion engine, wherein the integration circuit does not integrate (charge) the vibratory component that is greater than the second threshold value.

According to a still further aspect of the present invention, there is provided a knock detection apparatus for an internal combustion engine, wherein the integration circuit does not integrate (charge) the vibratory component for a period exceeding the second threshold value.

According to another aspect of the present invention, there is provided a knock detection apparatus for an internal combustion engine, wherein the integration circuit does not integrate (charge) the vibratory component that is not greater than the first threshold value and the integration circuit does not integrate (charge) the vibratory component that is greater than the second threshold value.

According to still another aspect of the present invention, there is provided a knock detection apparatus for an internal combustion engine, wherein the integration circuit does not integrate (charge) the vibratory component that is not greater than the first threshold value and the integration circuit does not integrate (charge) the vibratory component for a period exceeding the second threshold value.

According to a further aspect of the present invention, there is provided a knock detection apparatus for an internal combustion engine, wherein the integration circuit integrates (charges) the vibratory component for a predetermined integration period, and the predetermined integration period is a period starting from a time when the integration (charge) of the ionic current at a time when the ionic current that is equal to or more than a predetermined value is generated for a predetermined period of time while the integration (charge) voltage is equal to or more than a predetermined value until the ionic current is equal to or less than a predetermined amount, the discharge circuit performs discharge at a constant current during a predetermined discharge period, and the predetermined discharge period is a time period from a time when the ionic current that is equal to or more than a predetermined amount occurs for a predetermined period of time is generated while the integration (charge) of the ionic current from this time is started until a time when the integration (charge) voltage is equal to or more than a predetermined level, and a fixed time period following this time, the vibratory component is shaped in waveform by a second threshold value obtained by adding a predetermined voltage to a first threshold value that is the above-described threshold value, the integration circuit does not integrate (charge) the vibratory component that is not greater than the first threshold value and the integration circuit does not integrate (charge) the vibratory component for a period exceeding the second threshold value, and the second threshold value has an upper limit and a lower limit.

DESCRIPTION OF THE PREFERRED EMBODIMENTS

The present invention will now be described with reference to the accompanying drawings.

Embodiment 1

Figure 1:
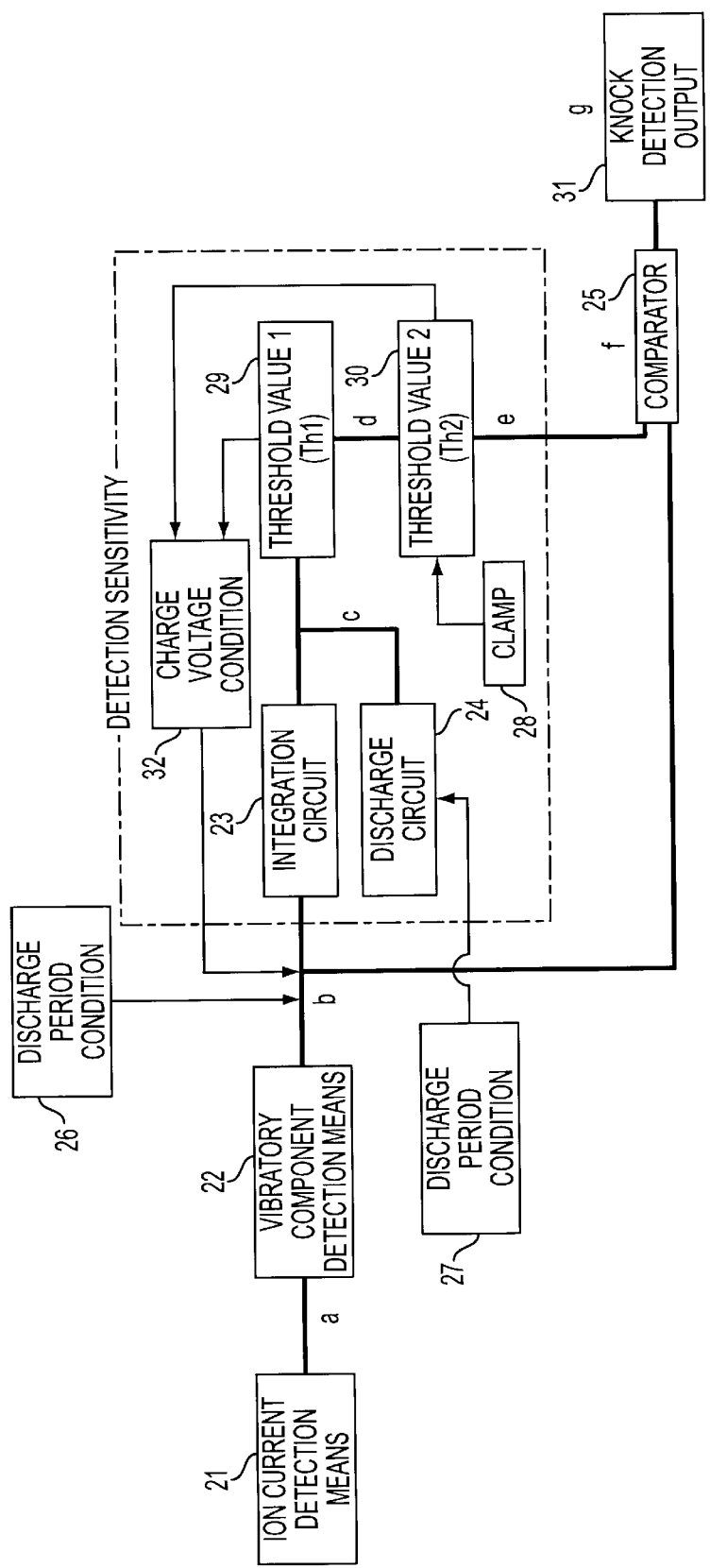
FIG. 1 is a block diagram showing a primary part of a knock detection apparatus for an internal combustion engine according to the present invention.

FIG. 1 is a block diagram showing a primary part of a knock detection apparatus for an internal combustion engine according to the present invention. The knock detection apparatus in the present embodiment is basically composed of an ionic current detection means 21 for detecting ionic current generated by the combustion, a vibratory component extraction means 22 for extracting a vibratory component superimposed on the ionic current, an integration circuit 23 for integrating (charging) an area of the vibratory component, and a discharge circuit 24 for discharging a predetermined amount of charge from the integrated charge, a comparator 25 as a comparison means, discharge period conditions 26 and 27, a clamp 28, and further provided with a knock detection output 31. The comparator 25 detects a knock by comparing a threshold value Th1 29 adjusted by a balance of the charge/discharge and a threshold value Th2 30 for detection the knock with the vibratory component superimposed on the ionic current.

Figure 2:
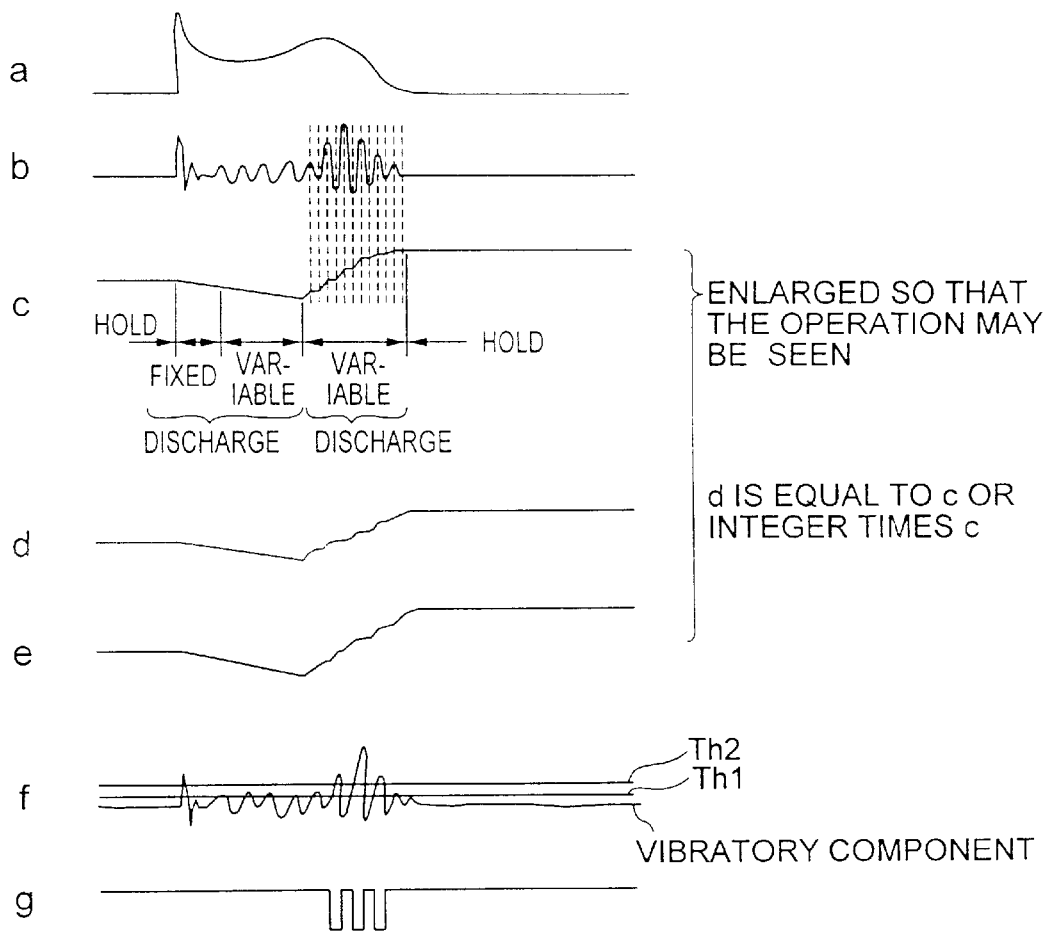
FIG. 2 is a timing chart showing an operational waveform of each part of the knock detection apparatus shown in FIG. 1.

FIG. 2 is a timing chart showing an operational waveform of each portion (positions indicated by reference characters a to g in FIG. 1) of the knock detection apparatus shown in FIG. 1. Reference character a represents an ionic current waveform outputted from the ionic current detection means 21, reference character b represents a vibration waveform extracted by the vibratory component extraction means 22, reference character c represents a charge/discharge waveform by the integration circuit 23 and the discharge circuit 24, reference character d represents a first threshold value Th1 determined by the balance of the charge/discharge, reference character e represents a second threshold value 2 determined by a function of the threshold value Th1, reference character f represents the inputs of the comparator 25, i.e., the vibratory component, the threshold value Th1 and the threshold value Th2 superimposed on the ionic current, and reference character g represent the output (knock detection output pulse).

The conditions of the periods for discharge/charge in the timing chart of FIG. 2 are as follows:

The integration circuit 23 integrates (charges) the vibratory component for a predetermined integration period. The integration period is a period when the integration (charge) of the ionic current starts from a time when the ionic current exceeding a predetermined amount occurs for a predetermined period of time from the time when the integration voltage is equal to or more than the predetermined level until the ionic current becomes a predetermined level or less.

The discharge circuit 24 discharges at a constant current for a predetermined discharge period. The discharge period starts from a time when the ionic current exceeding a predetermined amount is generated. Also, the integration (charge) of the ionic current starts from this time, and the integration time continues until the time when the integration voltage is equal to or more than the predetermined level and includes the fixed period following this.

The vibratory component is shaped in waveform by the second threshold value Th2 obtained by adding a predetermined voltage that is a function of the first threshold value Th1 to the first threshold value Th1 determined by the balance of the charge/discharge.

The integration circuit 23 does not integrate the vibratory component that is equal to or less than the first threshold value Th1 and does not integrate the vibratory component that exceeds the second threshold value Th2.

The second threshold value Th2 has an upper limit and a lower limit.

Embodiment 2

In this embodiment, the charge period of the vibratory component is restricted so as to realize means for adjusting the threshold value to a threshold value by which the noise vibratory component of the actual knock detection range and the knock vibratory component are clearly distinguished from each other.

Figure 3:
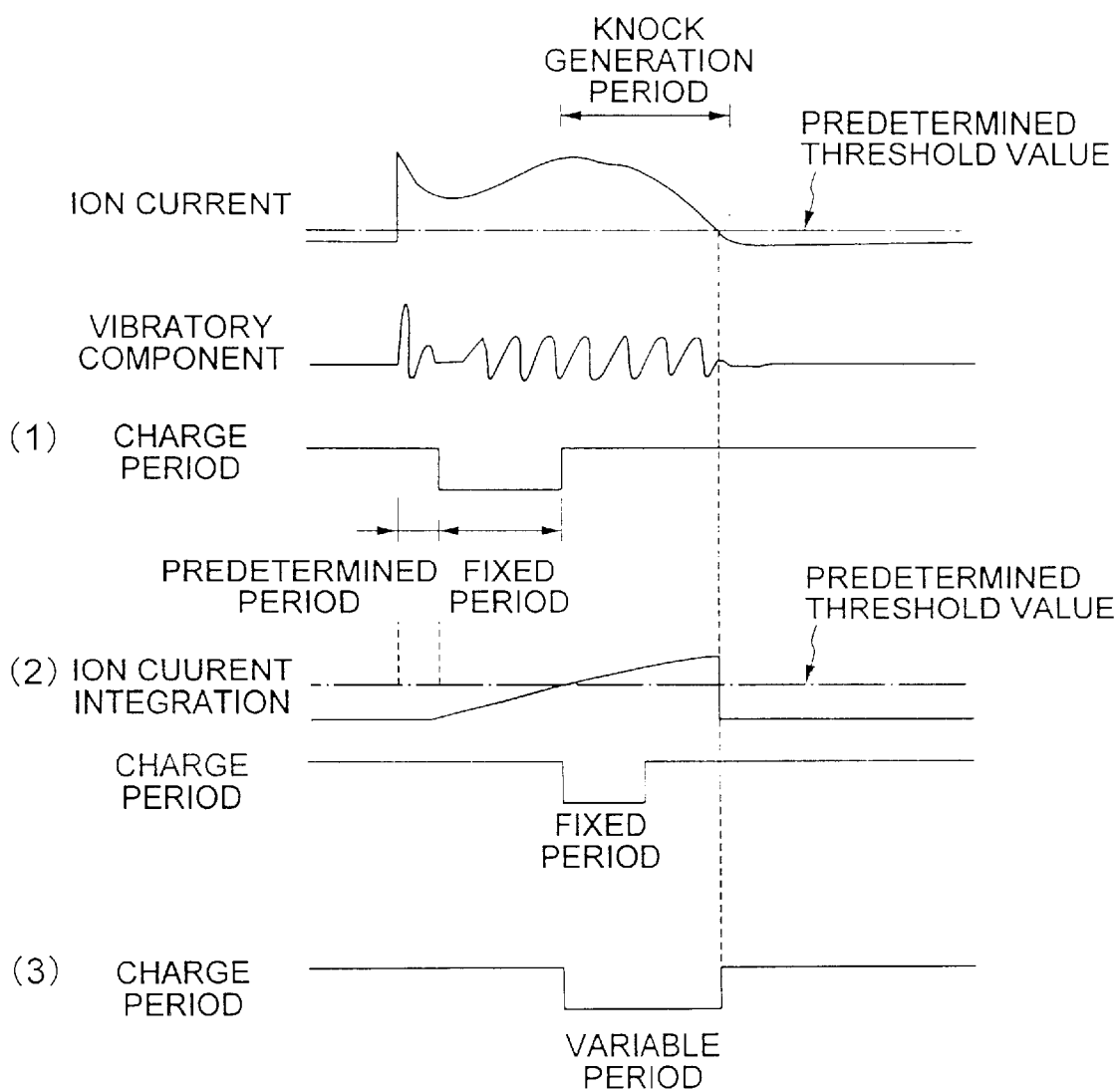
FIG. 3 is a diagram showing charge periods for an ionic current and an extracted vibratory component.

FIG. 3 shows a charge period for the ionic current and the extracted vibratory component. In FIG. 3;

(1) represents the case where the period during which the area of the vibratory component is integrated (charged) is a fixed time from the time when the ionic current that is equal to or more than a predetermined threshold value occurs for a predetermined period of time:

(2) represents the case where the period during which the area of the vibratory component is integrated (charged) is a fixed time from the time when the integration voltage is equal to or more than the predetermined level while the integration (charge) of the ionic current starts from the time when the ionic current that is equal to or more than a predetermined threshold value occurs for a predetermined period of time: and (3) represents the case where the period during which the area of the vibratory component is integrated (charged) is from the time when the integration (charge) voltage is equal to or more than the predetermined level until the ionic current becomes equal to or less than a predetermined threshold value, while the integration (charge) of the ionic current starts from the time when the ionic current that is equal to or more than a predetermined threshold value occurs for a predetermined period of time.

Embodiment 3

In this embodiment, the discharge is performed at a constant current and the discharge period is restricted so as to realize means for adjusting the threshold value to a threshold value by which the noise vibratory component of the actual knock detection range and the knock vibratory component are clearly distinguished from each other.

Figure 4:
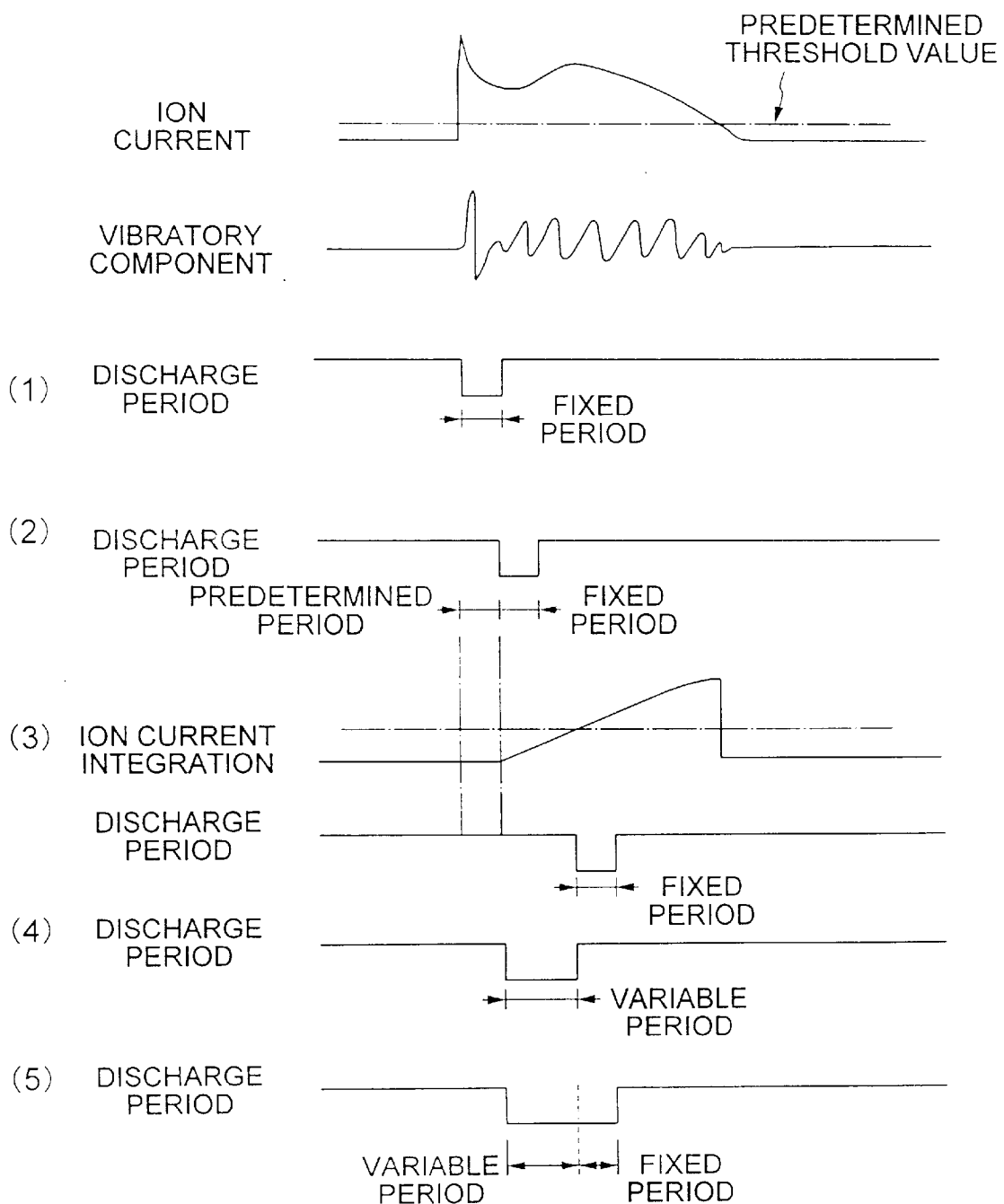
FIG. 4 is a diagram showing discharge periods for an ionic current and an extracted vibratory component.

FIG. 4 shows a discharge period for the ionic current and the extracted vibratory component. In FIG. 4;

(1) represents the case where the discharge period is a fixed time period from the time when the ionic current is equal to or more than a predetermined threshold value:

(2) represents the case where the discharge period is a fixed time period from a time when the ionic current that is equal to or more than a predetermined threshold value occurs for a predetermined period of time:

(3) represents the case where the discharge period is a fixed time from the time when the integration (charge) voltage is equal to or more than the predetermined level while the integration (charge) of the ionic current starts from the time when the ionic current that is equal to or more than a predetermined threshold value occurs for a predetermined period of time.

(4) represents the case where the discharge period is a variable period starting from the time when the ionic current that is equal to or more than a predetermined threshold value occurs for a predetermined period of time while the integration (charge) of the ionic current starts from this point until the integration (charge) voltage is equal to or more than a predetermined level: and (5) represents the case where the discharge period is a variable period starting from the time when the ionic current that is equal to or more than a predetermined threshold value occurs for a predetermined period of time while the integration (charge) of the ionic current starts from this point until the integration (charge) voltage is equal to or more than a predetermined level, and a fixed time period following to the variable period.

Embodiment 4

Figure 5:
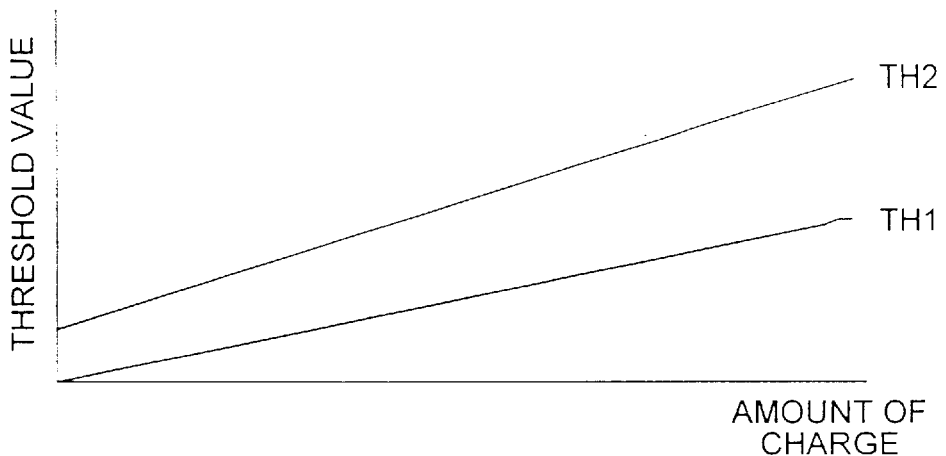
FIG. 5 is a graph showing an example of the relationship between a first threshold value Th1 determined by the balance of the charge/discharge and a second threshold value Th2 obtained by adding a predetermined voltage that is a function of the first threshold value Th1.
Figure 6:
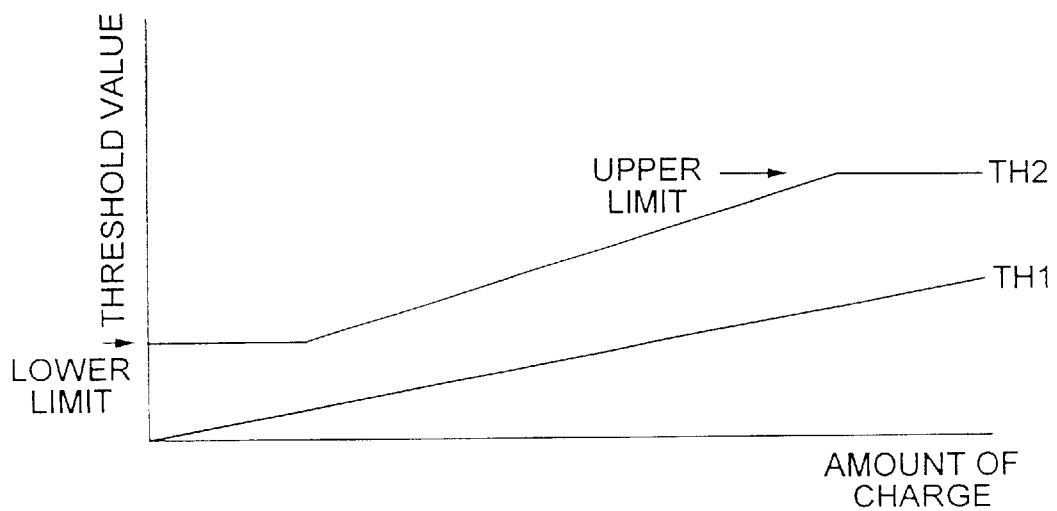
FIG. 6 is a graph showing an example in which upper and lower limits are provided for the second threshold value Th2.

FIG. 5 shows an example of the relationship between the first threshold value Th1 and the second threshold value Th2 in the case where the vibratory component is shaped in waveform by the second threshold value Th2 obtained by adding a predetermined voltage that is a function of the first threshold value Th1 to the first threshold value Th1 determined by the balance of the charge/discharge. Also, FIG. 6 shows an example in which upper and lower limits are provided for the second threshold value Th2.

Embodiment 5

Figure 7:
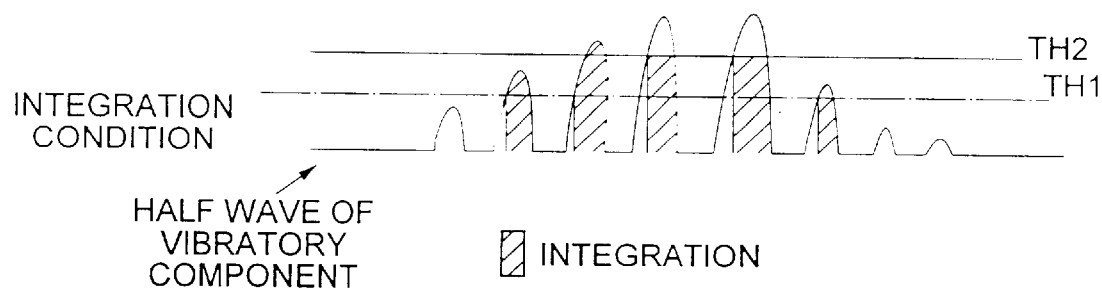
FIG. 7 is a diagram showing an example as a case where the integration condition is set up by the voltage value of the vibratory component, in which the vibratory component that is equal to or less than the first threshold value Th1 is not integrated and the vibratory component that is equal to or more than the second threshold value Th2 is not integrated.

FIG. 7 shows an example as a case where the integration condition is set up by the voltage value of the vibratory component. In this example, the vibratory component that is equal to or less than the first threshold value Th1 is not integrated (charged) and the vibratory component that is equal to or more than the second threshold value Th2 (i.e., a portion exceeding the second threshold value Th2) is not integrated (charged).

Figure 8:
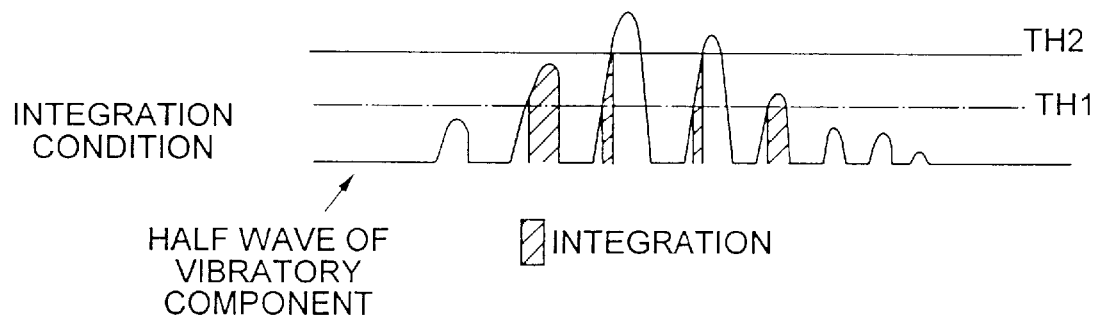
FIG. 8 is a diagram showing an example as a case where the integration condition is set up by the voltage value of the vibratory component, in which the vibratory component that is equal to or less than the first threshold value Th1 is not integrated and the vibratory component that is equal to or more than the second threshold value Th2 (all the vibration exceeding the second threshold value Th2) is not integrated.

Also, an example is shown in FIG. 8 in which the vibratory component that is equal to or less than the first threshold value Th1 is not integrated (charged) and the vibratory component is not integrated (charged) during the period exceeding the second threshold value Th2.

According to the present invention, since the threshold values for the knock detection is self-adjusted by the balance between the area integration (charge) of the vibratory component superimposed on the ionic current and the predetermined amount of discharge from the integrated (charge), even if a magnitude of the vibratory component changes according to a kind of an engine, an operational condition, a kind of spark plugs, a kind of fuel, a kind of ignition agent or the like, it is possible to obtain the good detectability.

Furthermore, some conditions are added to the charge, the discharge and the threshold values, to thereby further enhance the detectability. This point will now be described.

The charge period of the vibratory component is restricted so as to realize means for adjusting the threshold value to a threshold value by which the noise vibratory component of the actual knock detection range and the knock vibratory component are clearly distinguished from each other.

In (1) of FIG. 3, at the beginning of flow of the ionic current, the noise current generated by the spark finish flows but it is possible to avoid this noise by starting the charge after a lapse of a predetermined time period. Also, the charge period is set at a fixed time before the knock generation timing so that the threshold value that is not contributed to the knock vibratory component may be set. Namely, it is possible to prevent the failure of the detection of an intermediate size knock as a result of the increment of the threshold value by the vibratory component of the large knock.

However, in (1) of FIG. 3, the noise component is not contributed at the timing when the knock is generated (including the case where no knock is generated).

Accordingly, in the case where a difference in noise amount between the knock generation timing and the non-knock generation timing is remarkable, there are cases that it is impossible to obtain a suitable threshold value.

In (2) of FIG. 3, the charge period for reducing this effect is the fixed period during the knock generation timing. (In this case, it is necessary to additionally use the integration condition by the vibratory component voltage as described below.) Also, the detection of the knock generation timing at this time is based upon the detection of the integrated value of the ionic current.

Thus, since the threshold value may be set by the noise component of the knock generation timing, it is possible to obtain a higher precision threshold value.

Figure 9:
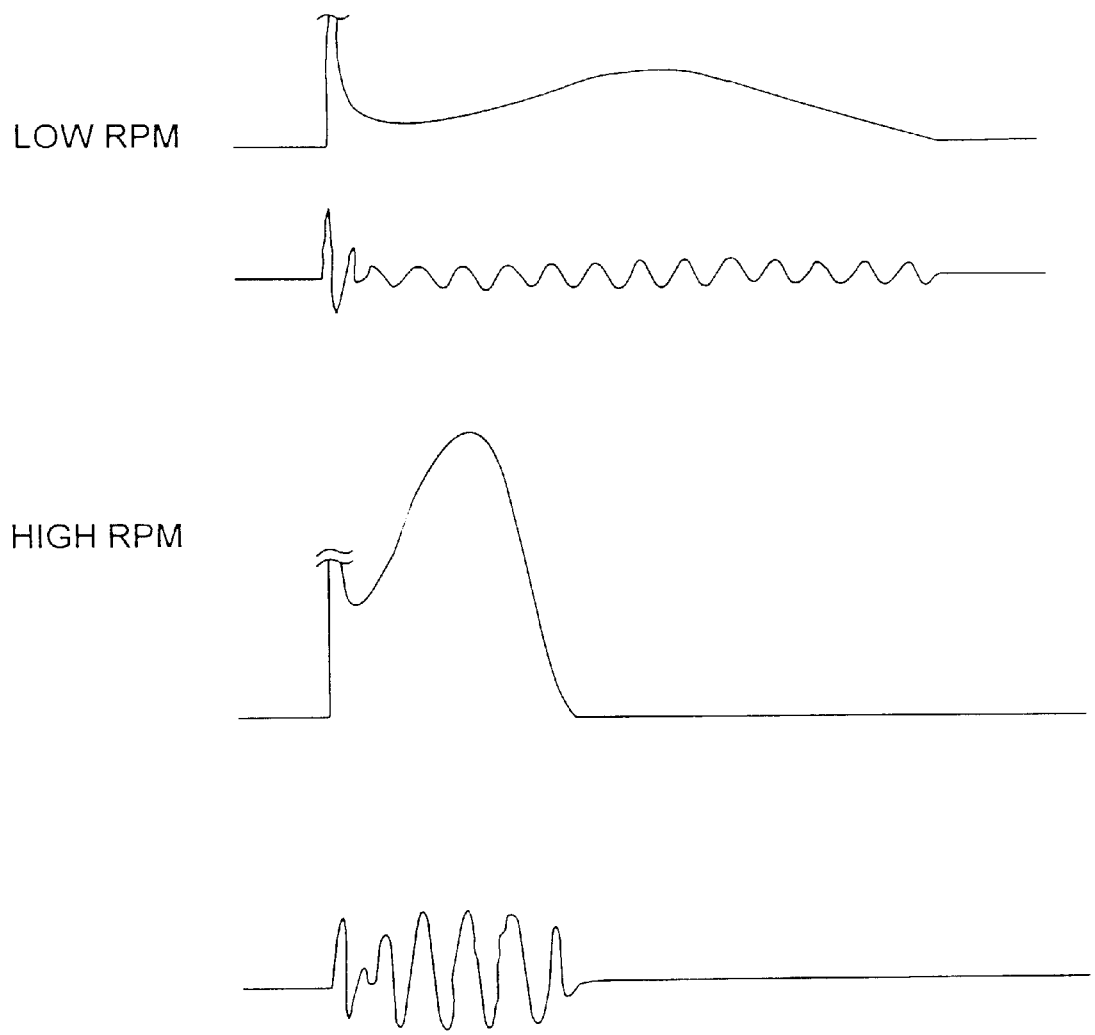
FIG. 9 is a graph showing a state in which the generation time of the ionic current is long when the rpm is low and the vibratory component generation period of the knock is also long but when the rpm is high, both become short.
Figure 10:
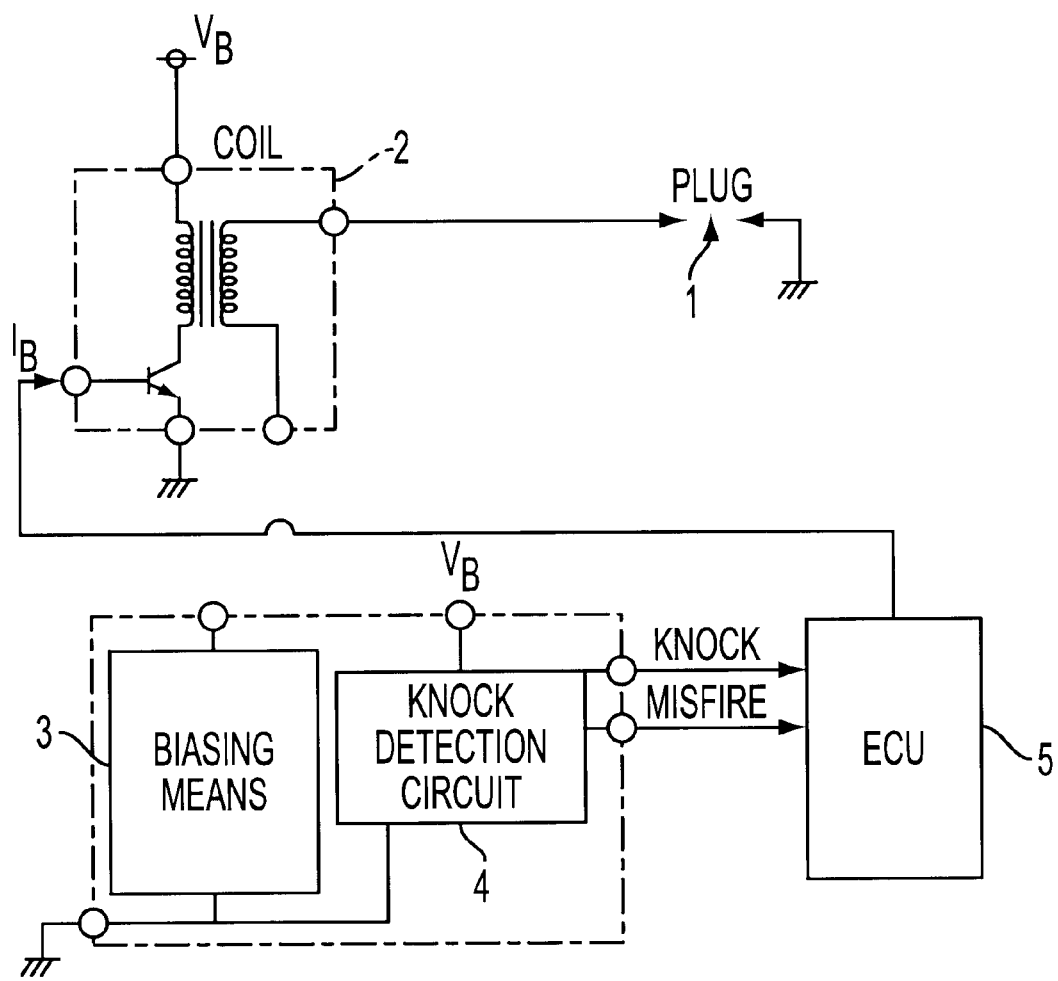
FIG. 10 is a circuit diagram showing a conventional knock detection apparatus using an ionic current.
Figure 11:
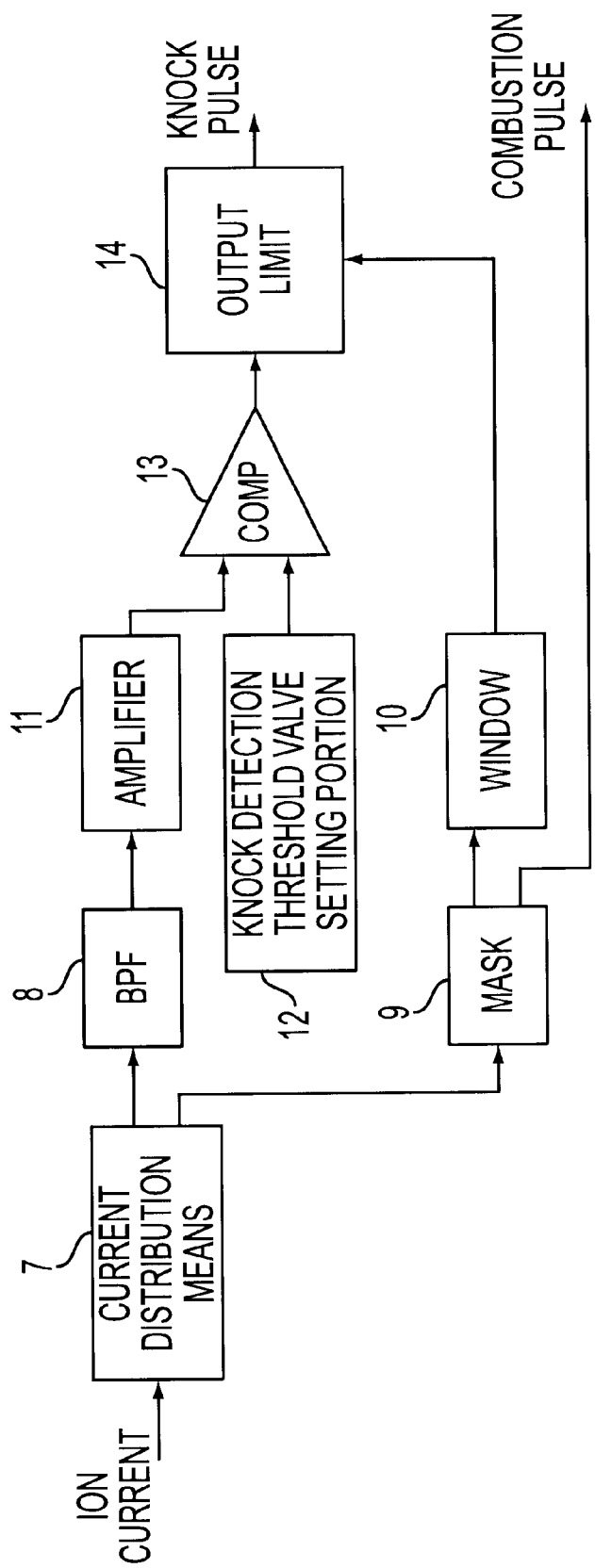
FIG. 11 is a block diagram showing in detail the knock detection circuit shown in FIG. 10.
Figure 12:
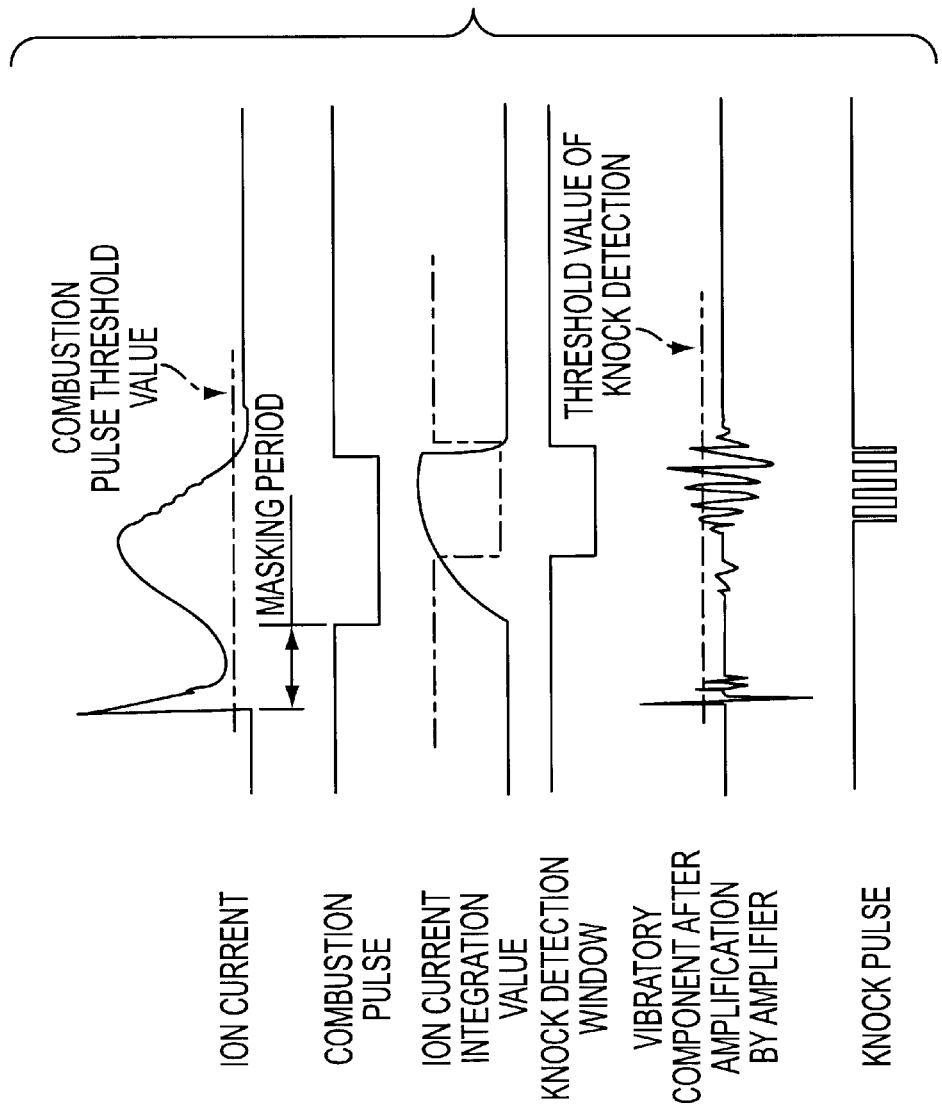
FIG. 12 is a timing chart showing an operational waveform of each part of the circuit shown in FIG. 11.
Figure 13:
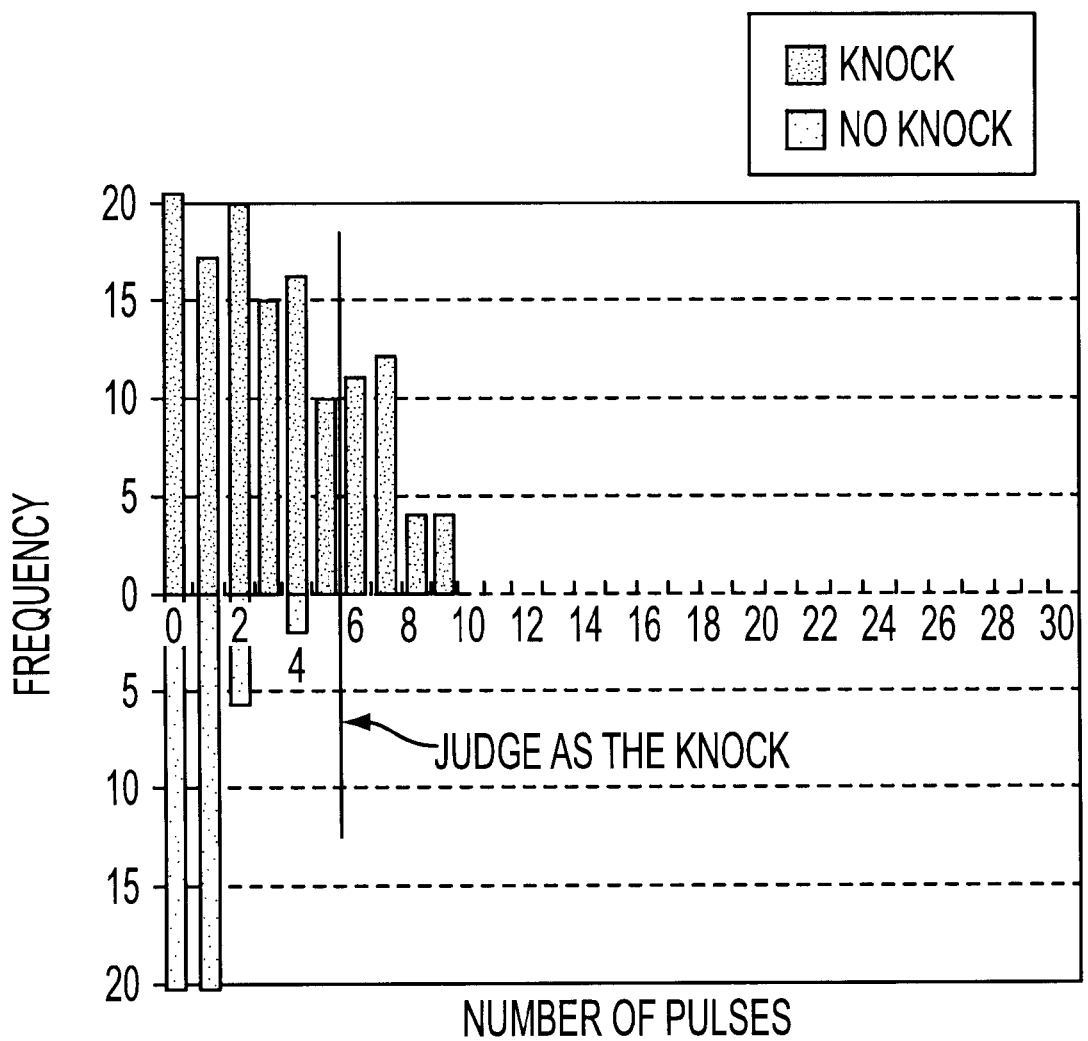
FIG. 13 is an S/N graph of the number of knock pulses upon the knock/non-knock.
Figure 14:
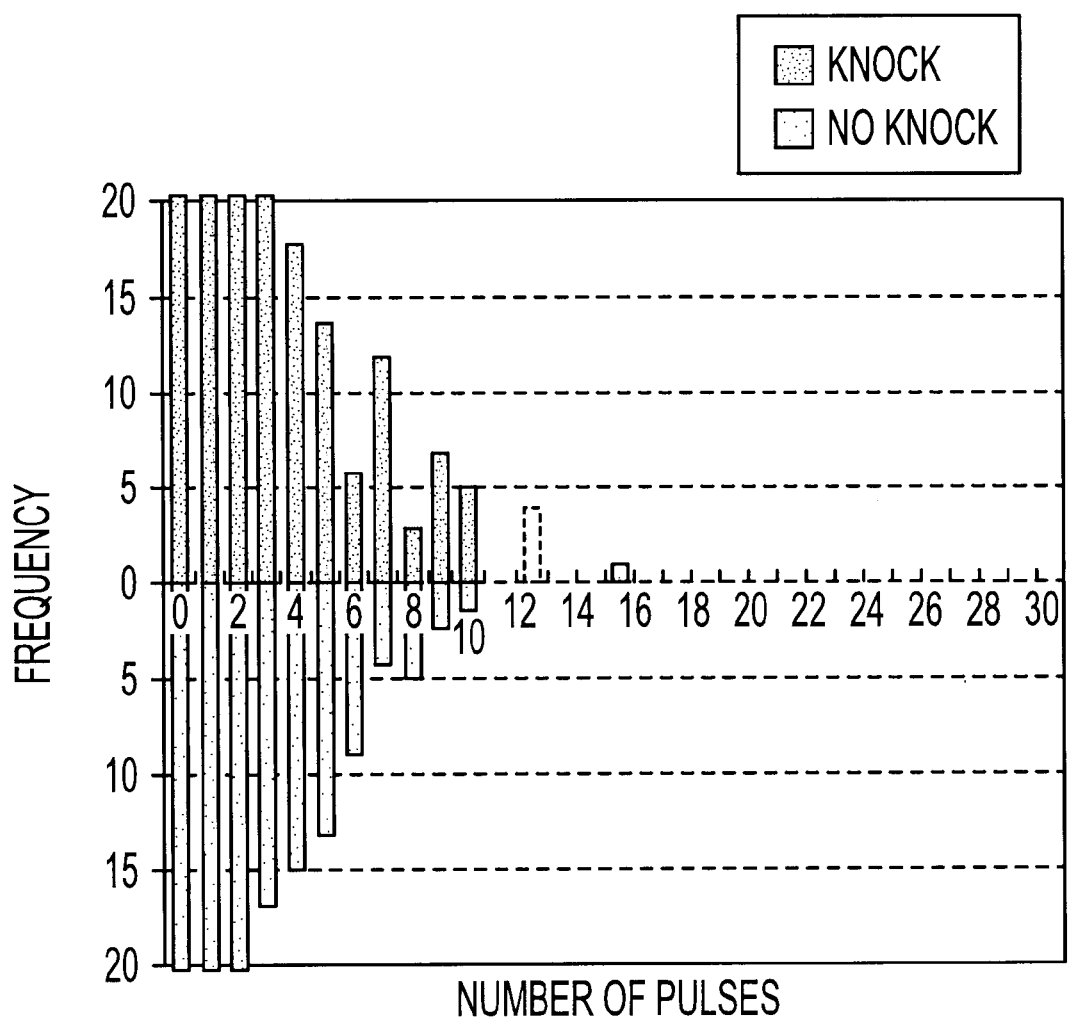
FIG. 14 is an S/N graph upon the mixture of additive measured under the same operational condition as that of FIG. 13.

Also, as shown in FIG. 9, the generation time of the ionic current is long when the rpm is low, and the vibratory component generation period of the knock is also long. However, when the rpm is high, both become short.

In contrast, in (1) and (2) of FIG. 3, the period during which the vibratory component is picked up is kept constant. Accordingly, the reflection of vibratory component to the threshold value is varied in accordance with the rpm. (3) of FIG. 3 further improves this point. (In this case, it is necessary to additionally use the integration condition by the vibratory component voltage as described below.) The effect will be described in the case where the discharge is performed at a constant current and the discharge period is restricted so as to realize means for adjusting the threshold value to a threshold value by which the noise vibratory component of the actual knock detection range and the knock vibratory component are clearly distinguished from each other.

In (1), (2) and (3) of FIG. 4, the discharge period is kept constant so that the constant discharge, which does not depend upon the rpm, for discharging a constant amount of charge to the single ionic current waveform may be performed.

By the way, in the case where the rpm is increased or the ignition agent or the like is mixed into the fuel, the noise amount is increased. It is therefore necessary to shift the threshold value to a higher level. In this case, it is confirmed that the area of the ionic current is also increased.

In view of this, in (4) of FIG. 4, a method in which the discharged amount is caused to depend upon the area is used as a method for shifting the threshold value to a higher level. Thus, when the area of the ionic current is large, the discharge period becomes short with a tendency to increase the threshold value.

In (5) of FIG. 4, the above-described constant discharge and the discharge depending upon the area are used in combination, thereby obtaining a more suitable threshold value. Here, the combination of (3) and (4) is used but it is possible to obtain the same effect by using the combination of (1) and (2) or the like as the constant discharge. Also, if the constant current source is individually set in a separate, it is easier to perform the adjustment.

The effect of providing the threshold value Th1 that is determined by the charge/discharge of the vibratory component and the threshold value Th2 to which a predetermined voltage that is a function of the threshold value Th1 is added will now be described.

Since the threshold value Th1 is used for charge/discharge in accordance with the vibratory component, the threshold value Th1 is varied in accordance with a magnitude of the vibratory component. The value is balanced with the magnitude of the vibratory component. In the case where this value is used as the detection threshold value of the knock, even if the noise is generated at all times, the detection is performed by the noise. To cope with this, the threshold value Th2 to which the predetermined voltage is added is used as the detection threshold value of the knock, thereby preventing the misdetection of the noise.

Also, when the rpm is high, the load is low, or the noise is increased by the mixture of the ignition agent or the like, the variation of the noise is increased. By determining the additional value in accordance with the function of the threshold value Th1 that is determined by the noise, for example, by increasing the additional value, it is possible to further improve the detection precision.

The effect by setting the integration condition in accordance with the voltage value of the vibratory component will now be described. The vibratory component that is equal to or less than the threshold value Th1 is not integrated so that the threshold value may be set on the basis of the large noise irrespective of the frequency or the magnitude of the vibratory component that is equal to or less than the threshold value Th1. It is therefore possible to obtained the effect that a suitable threshold value may be obtained while suppressing the increment of the unnecessary threshold value.

The effect that the vibratory component that is equal to or more than the threshold value Th2 (all the vibration exceeding the threshold value Th2) is not integrated is that the threshold value is prevented from being extremely increased by the generation of the knock to thereby obtain a suitable threshold value.

According to one aspect of the present invention, there is provided a knock detection apparatus for an internal combustion engine for detecting a knock generated in an internal combustion engine, in which a vibratory component superimposed on an ionic current generated by combustion of fuel is extracted and shaped in waveform into a pulse waveform by comparison with a threshold value, the number of the pulses in the pulse waveform is calculated by a calculation means, and a control of an ignition timing is performed on the basis of an output result of the calculation means, comprises an integration circuit for integrating (charging) the vibratory component superimposed on the ionic current; and a discharge circuit for discharging a predetermined amount of charge from the integrated charge, wherein the threshold value is self-adjusted by a balance of charge/discharge between the integration circuit and the discharge circuit. Since the threshold values for the knock detection is self-adjusted by the balance between the area integration (charge) of the vibratory component superimposed on the ionic current and the predetermined amount of discharge from the integrated (charge), even if a magnitude of the vibratory component changes according to a kind of an engine, an operational condition, a kind of spark plugs, a kind of fuel, a kind of ignition agent or the like, it is possible to obtain the good detectability.

According to another aspect of the present invention, there is provided a knock detection apparatus for an internal combustion engine, wherein the integration circuit integrates (charges) the vibratory component during a predetermined integration period. Hence, the integration period (charge period) of the vibratory component is restricted so as to realize means for adjusting the threshold value to a threshold value by which the noise vibratory component of the actual knock detection range and the knock vibratory component are clearly distinguished from each other.

According to still another aspect of the present invention, there is provided a knock detection apparatus for an internal combustion engine, wherein the integration period is a fixed time period from a time at which the ionic current that is equal to or more than a predetermined amount is generated during a predetermined period of time. Hence, at the beginning of flow of the ionic current, the noise current generated by the spark finish flows but it is possible to avoid this noise by starting the charge after a lapse of a predetermined time period. Also, the charge period is set at a fixed time before the knock generation timing so that the threshold value that is not contributed to the knock vibratory component may be set. Namely, it is possible to prevent the failure of the detection of an intermediate size knock as a result of the increment of the threshold value by the vibratory component of the large knock.

According to a further aspect of the present invention, there is provided a knock detection apparatus for an internal combustion engine, wherein the integration period is a fixed time period from a time when an integration (charge) voltage is equal to or more than a predetermined value while the integration (charge) of the ionic current starts from the time when the ionic current that is equal to or more than the predetermined amount occurs for a predetermined period of time. Hence, even in the case where a difference in noise amount between the knock generation timing and the non-knock generation timing is remarkable, it is possible to obtain a suitable threshold value.

According to a still further aspect of the present invention, there is provided a knock detection apparatus for an internal combustion engine, wherein the integration period is a time period from a time when an integration (charge) voltage is equal to or more than a predetermined value while the integration (charge) of the ionic current starts from the time when the ionic current that is equal to or more than the predetermined amount occurs for a predetermined period of time until the ionic current is equal to or less than a predetermined amount. Hence, it is possible to reflect the vibratory component to the threshold value in accordance with the rpm.

According to another aspect of the present invention, there is provided a knock detection apparatus for an internal combustion engine, wherein the discharge circuit performs the discharge at a constant current during a predetermined discharge period. Hence, it is possible to adjust the threshold value to a threshold value by which the noise vibratory component of the actual knock detection range and the knock vibratory component are clearly distinguished from each other.

According to still another aspect of the present invention, there is provided a knock detection apparatus for an internal combustion engine, wherein the discharge period is a fixed time period from a time when the ionic current that is equal to or more than a predetermined amount occurs. Hence, the constant discharge, which does not depend upon the rpm, for discharging a constant amount of charge to the single ionic current waveform may be performed.

According to a further aspect of the present invention, there is provided a knock detection apparatus for an internal combustion engine, wherein the discharge period is a fixed time period from a time when the ionic current that is equal to or more than a predetermined amount occurs for a predetermined period of time. Hence, the constant discharge, which does not depend upon the rpm, for discharging a constant amount of charge to the single ionic current waveform may be performed.

According to a still further aspect of the present invention, there is provided a knock detection apparatus for an internal combustion engine, wherein the discharge period is a fixed time period from a time when an integration (charge) voltage is equal to or more than a predetermined value while the integration (charge) of the ionic current starts from the time when the ionic current that is equal to or more than the predetermined amount occurs for a predetermined period of time. Hence, the constant discharge, which does not depend upon the rpm, for discharging a constant amount of charge to the single ionic current waveform may be performed.

According to another aspect of the present invention, there is provided a knock detection apparatus for an internal combustion engine, wherein the discharge period is a time period from a time when the ionic current that is equal to or more than a predetermined value occurs for a predetermined period of time while the integration (charge) of the ionic current starts from the time when the ionic current that is equal to or more than the predetermined amount occurs until the integration (charge) voltage is equal to or more than a predetermined amount. Hence, the discharged amount that is caused to depend upon the area is used as a method for shifting the threshold value to the high level.

According to still another aspect of the present invention, there is provided a knock detection apparatus for an internal combustion engine, wherein the discharge period is a period from a time when the ionic current that is equal to or more than a predetermined value occurs for a predetermined period of time while the integration (charge) of the ionic current starts from the time when the ionic current that is equal to or more than the predetermined amount occurs until the integration (charge) voltage is equal to or more than a predetermined amount and a fixed period following the period. Hence, the constant discharge and the discharge depending upon the area are used in combination, thereby obtaining a more suitable threshold value.

According to a further aspect of the present invention, there is provided a knock detection apparatus for an internal combustion engine, wherein the vibratory component is shaped in waveform by a second threshold value obtained by adding a predetermined voltage to a first threshold value that is the threshold value. Hence, it is possible to prevent the misdetection by the constantly generated noise.

According to a still further aspect of the present invention, there is provided a knock detection apparatus for an internal combustion engine, wherein the voltage added to the first threshold value is a function of the first threshold value. Hence, when the rpm is high, the load is low, or the noise is increased by the mixture of the ignition agent or the like, the variation of the noise is increased. By determining the additional value in accordance with the function of the first threshold value that is determined by the noise, for example, by increasing the additional value, it is possible to further improve the detection precision.

According to another aspect of the present invention, there is provided a knock detection apparatus for an internal combustion engine, wherein an area, to be integrated (charged), of the vibratory component on the basis of at least one of the first threshold value and the second threshold value is only a predetermined portion. Hence, it is possible to obtain a suitable threshold value.

According to still another aspect of the present invention, there is provided a knock detection apparatus for an internal combustion engine, wherein the integration circuit does not integrate (charge) the vibratory component that is not greater than the first threshold value. Hence, it is possible to solve the problem that the integration is performed in vain to increase the threshold value.

According to a further aspect of the present invention, there is provided a knock detection apparatus for an internal combustion engine, wherein the integration circuit does not integrate (charge) the vibratory component that is greater than the second threshold value. Hence, the threshold value is prevented from being extremely increased by the generation of the knock to thereby obtain a suitable threshold value.

According to a still further aspect of the present invention, there is provided a knock detection apparatus for an internal combustion engine, wherein the integration circuit does not integrate (charge) the vibratory component for a period exceeding the second threshold value. Hence, the threshold value is prevented from being extremely increased by the generation of the knock to thereby obtain a suitable threshold value.

According to another aspect of the present invention, there is provided a knock detection apparatus for an internal combustion engine, wherein the integration circuit does not integrate (charge) the vibratory component that is not greater than the first threshold value and the integration circuit does not integrate (charge) the vibratory component that is greater than the second threshold value. Hence, it is possible to solve the problem that the integration is performed in vain to increase the threshold value and also, the threshold value is prevented from being extremely increased by the generation of the knock to thereby obtain a suitable threshold value.

According to still another aspect of the present invention, there is provided a knock detection apparatus for an internal combustion engine, wherein the integration circuit does not integrate (charge) the vibratory component that is not greater than the first threshold value and the integration circuit does not integrate (charge) the vibratory component for a period exceeding the second threshold value. Hence, it is possible to solve the problem that the integration is performed in vain to increase the threshold value and also, the threshold value is prevented from being extremely increased by the generation of the knock to thereby obtain a suitable threshold value.

According to a further aspect of the present invention, there is provided a knock detection apparatus for an internal combustion engine, wherein the integration circuit integrates (charges) the vibratory component for a predetermined integration period, and the predetermined integration period is a period starting from a time when the integration (charge) of the ionic current at a time when the ionic current that is equal to or more than a predetermined value is generated for a predetermined period of time while the integration (charge) voltage is equal to or more than a predetermined value until the ionic current is equal to or less than a predetermined amount, the discharge circuit performs discharge at a constant current during a predetermined discharge period, and the predetermined discharge period is a time period from a time when the ionic current that is equal to or more than a predetermined amount occurs for a predetermined period of time is generated while the integration (charge) of the ionic current from this time is started until a time when the integration (charge) voltage is equal to or more than a predetermined level, and a fixed time period following this time, the vibratory component is shaped in waveform by a second threshold value obtained by adding a predetermined voltage to a first threshold value that is the above-described threshold value, the integration circuit does not integrate (charge) the vibratory component that is not greater than the first threshold value and the integration circuit does not integrate (charge) the vibratory component for a period exceeding the second threshold value, and the second threshold value has an upper limit and a lower limit.

Hence, it is possible to reflect the vibratory component to the threshold value in accordance with the rpm. The constant discharge and the discharge depending upon the area are used in combination, thereby obtaining a more suitable threshold value. By determining the additional value in accordance with the function of the first threshold value that is determined by the noise, for example, by increasing the additional value, it is possible to further improve the detection precision. It is possible to solve the problem that the integration is performed in vain to increase the threshold value and also, the threshold value is prevented from being extremely increased by the generation of the knock to thereby obtain a suitable threshold value. Since the threshold values for the knock detection is self-adjusted by the balance between the area integration (charge) of the vibratory component superimposed on the ionic current and the predetermined amount of discharge from the integration (charge), even if a magnitude of the vibratory component changes according to a kind of an engine, an operational condition, a kind of spark plugs, a kind of fuel, a kind of ignition agent or the like, it is possible to obtain the good detectability.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A knock detection apparatus for an internal combustion engine for detecting a knock generated in said internal combustion engine, in which a vibratory component superimposed on an ionic current generated by combustion of fuel is extracted and shaped into a pulse waveform by comparison with a threshold value, a calculation means for calculating the number of pulses in the pulse waveform to control an ignition timing on the basis of an output result of the calculation means, comprising:

an integration circuit for integrating said vibratory component superimposed on said ionic current; and a discharge circuit for discharging a predetermined amount of charge from an integrated charge of said integration circuit, wherein said threshold value is self-adjusted by a balance of charge/discharge between said integration circuit and said discharge circuit.

2. The knock detection apparatus for said internal combustion engine according to claim 1, wherein said integration circuit integrates the vibratory component during a predetermined integration period.

3. The knock detection apparatus for said internal combustion engine according to claim 2, wherein said integration period is a fixed time period after a predetermined period of time from a time at which the ionic current is equal to or more than a predetermined value.

4. The knock detection apparatus for said internal combustion engine according to claim 2, wherein said integration period is a fixed time period from a time when an integration voltage is equal to or more than a predetermined level while the integration of the ionic current starts after a predetermined period of time from the time when the ionic current is equal to or more than a predetermined value.

5. The knock detection apparatus for said internal combustion engine according to claim 2, wherein said integration period is a time period from a time when an integration voltage is equal to or more than a predetermined level until the ionic current is equal to or less than a predetermined value, while the integration of the ionic current starts from the time when the ionic current is equal to or more than the predetermined value for a predetermined period of time.

6. The knock detection apparatus for an internal combustion engine according to claim 1, wherein said discharge circuit performs the discharge at a constant current during a predetermined discharge period.

7. The knock detection apparatus for said internal combustion engine according to claim 6, wherein said discharge period is a fixed time period from a time when the ionic current is equal to or more than a predetermined value.

8. The knock detection apparatus for said internal combustion engine according to claim 6, wherein said discharge period is a fixed time period after a predetermined period of time from a time when the ionic current is equal to or more than a predetermined value.

9. The knock detection apparatus for said internal combustion engine according to claim 6, wherein said discharge period is a fixed time period from a time when an integration voltage is equal to or more than a predetermined level while the integration of the ionic current starts after a predetermined period of time from the time when the ionic current that is equal to or more than a predetermined value.

10. The knock detection apparatus for said internal combustion engine according to claim 6, wherein said discharge period is a time period from a time when the ionic current is equal to or more than a predetermined value for a predetermined period of time while the integration of the ionic current starts from the time when the ionic current that is equal to or more than the predetermined value until the integration voltage is equal to or more than a predetermined level.

11. The knock detection apparatus for said internal combustion engine according to claim 6, wherein said discharge period is a period from a time when the ionic current is equal to or more than a predetermined value for a predetermined period of time while the integration of the ionic current starts from the time when the ionic current is equal to or more than the predetermined value until the integration voltage is equal to or more than a predetermined level and a fixed period following the predetermined period of time.

12. The knock detection apparatus for said internal combustion engine according to claim 1, wherein said vibratory component is shaped in waveform by a second threshold value obtained by adding a predetermined voltage to a first threshold value.

13. The knock detection apparatus for an internal combustion engine according to claim 12, wherein said voltage added to said first threshold value is a function of said first threshold value.

14. The knock detection apparatus for said internal combustion engine according to claim 12, wherein the number of pulses of the vibratory component are intersected by said first threshold value and said second threshold value, such that an area to be integrated is determined based on at least one of said first threshold value and said second threshold value.

15. The knock detection apparatus for said internal combustion engine according to claim 14, wherein said integration circuit does not integrate tile vibratory component that is less than the first threshold value.

16. The knock detection apparatus for said internal combustion engine according to claim 14, wherein said integration circuit does not integrate the vibratory component that is greater than said second threshold value.

17. The knock detection apparatus for said internal combustion engine according to claim 14, wherein said integration circuit does not integrate the vibratory component for a period exceeding said second threshold value.

18. The knock detection apparatus for said internal combustion engine according to claim 14, wherein said integration circuit does not integrate the vibratory component that is less than the first threshold value and said integration circuit does not integrate the vibratory component that is greater than said second threshold value.

19. The knock detection apparatus for said internal combustion engine according to claim 14, wherein said integration circuit does not integrate the vibratory component that is less than the first threshold value and said integration circuit does not integrate the vibratory component for a period exceeding said second threshold value.

20. The knock detection apparatus for said internal combustion engine according to claim 1, wherein said integration circuit integrates the vibratory component for a predetermined integration period, wherein the predetermined integration period is a period starting after a predetermined period of time from a time when the ionic current is equal to or more than a predetermined value and continues while the integration voltage is equal to or more than a predetermined value until tile ionic Current is equal to or less than a predetermined amount, said discharge circuit performs discharge at a constant current during a predetermined discharge period, wherein the predetermined discharge period is a time period after a predetermined period of time from a time when the ionic current is equal to or more than a predetermined value while the integration of the ionic current from this time is started until a time when the integration voltage is equal to or more than a predetermined level, and a fixed time period following this time, the vibratory component is shaped in waveform by a second threshold value obtained by adding a predetermined voltage to a first threshold value, said integration circuit does not integrate the vibratory component that is less than the first threshold value and said integration circuit does not integrate the vibratory component for a period exceeding said second threshold value, and said second threshold value being defined by an upper limit and a lower limit.

* * * * *